US009400775B2

(12) United States Patent
Rampson et al.

(10) Patent No.: US 9,400,775 B2
(45) Date of Patent: *Jul. 26, 2016

(54) DOCUMENT DATA ENTRY SUGGESTIONS

(71) Applicant: Microsoft Corporation, Redmond, WA (US)

(72) Inventors: Benjamin E. Rampson, Woodinville, WA (US); Karen X. Cheng, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/469,384

(22) Filed: Aug. 26, 2014

(65) Prior Publication Data

US 2014/0365874 A1    Dec. 11, 2014

Related U.S. Application Data

(63) Continuation of application No. 13/270,242, filed on Oct. 11, 2011, now Pat. No. 8,850,310.

(51) Int. Cl.
*G06F 17/24* (2006.01)
*G06F 3/023* (2006.01)
(Continued)

(52) U.S. Cl.
CPC .............. *G06F 17/24* (2013.01); *G06F 3/0237* (2013.01); *G06F 3/0482* (2013.01); *G06F 17/212* (2013.01); *G06F 17/243* (2013.01); *G06F 17/273* (2013.01)

(58) Field of Classification Search
CPC ... G06F 3/0237; G06F 17/243; G06F 17/273; G06F 17/212; G06F 17/24; G06F 3/0482
See application file for complete search history.

(56) References Cited

U.S. PATENT DOCUMENTS 5,845,300 A * 12/1998 Comer .................. G06F 17/276 715/203
6,377,965 B1 * 4/2002 Hachamovitch ...... G06F 17/276 715/203

(Continued)

FOREIGN PATENT DOCUMENTS

CN    1826215 A    8/2006
CN    1829987 A    9/2006

(Continued)

OTHER PUBLICATIONS

Schoenmakers, Bram, "Android Keyboards: An Overview", Retrieved at <<http://www.bramschoenmakers.nl/en/node/748>>, Jan. 22, 2011, pp. 6.

(Continued)

*Primary Examiner* — Maikhanh Nguyen
(74) *Attorney, Agent, or Firm* — Damon Rieth; Tom Wong; Micky Minhas

(57) ABSTRACT

A document having multiple data entry areas can be presented, and a list of suggestions for a designated data entry area can be generated. Generating the list can include analyzing a first set of data previously entered into one or more data entry areas of the document other than the designated data entry area and analyzing a second set of data including data outside the first set of data. The list of suggestions can be presented without having received manual entry of data in the designated data entry area, and user input selecting one of the suggestions can be received. Data represented by the selected suggestion can be entered in the data entry area in response to receiving the user input selecting the selected suggestion.

20 Claims, 13 Drawing Sheets

(51) Int. Cl.
*G06F 3/0482* (2013.01)
*G06F 17/21* (2006.01)
*G06F 17/27* (2006.01)

(56) References Cited

U.S. PATENT DOCUMENTS

| | | | |
|---|---|---|---|
| 6,564,213 B1 | 5/2003 | Ortega et al. | |
| 6,651,217 B1 | 11/2003 | Kennedy et al. | |
| 6,704,727 B1 | 3/2004 | Kravets | |
| 6,820,075 B2 | 11/2004 | Shanahan et al. | |
| 7,185,271 B2 * | 2/2007 | Lee | G06F 17/30861 707/E17.107 |
| 7,296,223 B2 * | 11/2007 | Chidlovskii | G06F 17/2247 704/257 |
| 7,487,145 B1 | 2/2009 | Gibbs et al. | |
| 7,565,157 B1 | 7/2009 | Ortega et al. | |
| 7,630,980 B2 * | 12/2009 | Parikh | G06F 17/276 |
| 7,685,119 B2 | 3/2010 | Riise et al. | |
| 7,685,144 B1 | 3/2010 | Katragadda | |
| 7,698,173 B1 | 4/2010 | Burge et al. | |
| 7,698,178 B2 | 4/2010 | Chu | |
| 7,774,002 B1 | 8/2010 | Ortega et al. | |
| 7,809,719 B2 * | 10/2010 | Furuuchi | G06F 17/276 707/723 |
| 7,996,589 B2 * | 8/2011 | Schultz | G06F 3/04883 345/156 |
| 2004/0268236 A1 * | 12/2004 | Chidlovskii | G06F 17/2247 715/234 |
| 2006/0085392 A1 | 4/2006 | Wang et al. | |
| 2006/0282575 A1 | 12/2006 | Schultz et al. | |
| 2008/0154856 A1 | 6/2008 | Riise et al. | |
| 2008/0154888 A1 | 6/2008 | Buron et al. | |
| 2008/0168033 A1 | 7/2008 | Ott et al. | |
| 2009/0150322 A1 * | 6/2009 | Bower | G06F 17/276 706/50 |
| 2012/0005583 A1 | 1/2012 | Wong | |

FOREIGN PATENT DOCUMENTS

| | | |
|---|---|---|
| CN | 101164054 A | 4/2008 |
| CN | 101842243 A | 9/2010 |

OTHER PUBLICATIONS

"The Properties of CN Half Screen Keyboard V 3.5", Retrieved at <<http://www.cn-solution.com/press-info/pressrelease_05.html, Retrieved Date: Jul. 26, 2011, pp. 4.

"Using AutoComplete in HTML Forms", Retrieved at <<http://msdn.microsoft.com/en-us/library/ms533032(v=vs.85).aspx>>, Retrieved Date: Jul. 25, 2011, pp. 6.

"AutoComplete", Retrieved at <<http://wiki.orbeon.com/forms/doc/developer-guide/xbl-components/autocomplete>>,Retrieved Date: Jul. 25, 2011, p. 1.

"Completing and Submitting PDF Forms", Retrieved at <<http://help.adobe.com/en_US/acrobat/standard/using/WS58a04a822e3e50102bd615109794195ff-7dd2.w.html, Retrieved Date Sep. 15, 2011, pp. 3.

"Understanding AutoComplete", Retrieved at <<http://excel.tips.net/T002110_Understanding_AutoComplete.html>>. Retrieved Date Sep. 15, 2011, pp. 2.

"Using AutoComplete in HTML Forms", Retrieved at <<http://excel.tips.net/T002110_Understanding_AutoComplete.html>>, Retrieved Date Sep. 15, 2011, pp. 6.

Dodge et al., excerpts from "Microsoft Excel 2010 Inside Out", Copyright Date: Aug. 26, 2010, 38 Pages.

"First Office Action and Search Report Issued in Chinese Patent Application No. 201210383011.3", Mailed Date: Oct. 13, 2014, 16 Pages.

* cited by examiner

DOCUMENT DATA ENTRY SUGGESTIONS

RELATED APPLICATIONS

The present application is a continuation of U.S. application Ser. No. 13/270,242, filed Oct. 11, 2011, which is incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

Data entry in computing devices can be difficult and time-consuming in some situations. For example, typing on a slate device with a virtual keyboard (a keyboard displayed on a touch screen) can be slow and cumbersome, especially when on the go. However, some slate device users want to be able to modify documents using these devices. Tools have been developed for making data input in slate devices and other computing device more efficient. These features include autocorrect and text suggestion features.

SUMMARY

Existing autocorrect and text suggestion features can involve a user typing nearly the full word or sentence they desire into a keyboard to get a suggestion. The tools and techniques described herein relate to using data already entered in a document for providing data entry suggestions (referred to herein as suggestions) for a designated data entry area in the document. A suggestion list may be displayed without having received manual entry of data in the designated data entry area. As used herein, a suggestion list is a group of one or more data entry suggestions. The group of suggestions may be formatted in any of various different ways. The suggestion list can be generated using data from multiple different sources, such as data already entered into a designated data entry area of a document, data entered into other areas of the document, and dictionary entries. Other data entry suggestion features are also discussed below. The features may be used separately or in various combinations with each other.

In one embodiment, the tools and techniques can include presenting a document having multiple data entry areas. User input can be received, where the user input is directed at a designated data entry area. For example, the user input may be user input selecting the designated data entry area and/or indicating that the designated data entry area is to be edited. A list of suggestions can be generated for the designated data entry area. Generating the list can include analyzing data previously entered into one or more data entry areas of the document other than the designated data entry area. The list of suggestions can be presented without having received manual entry of data in the designated data entry area. User input selecting one of the suggestions can be received, and data represented by the selected suggestion can be entered in the data entry area in response to receiving the user input selecting the selected suggestion.

In another embodiment of the tools and techniques, a document having multiple data entry areas can be presented. A list of suggestions for selected designated data entry area can be generated. Generating the list can include analyzing a first set of data previously entered into one or more data entry areas of the document other than the designated data entry area and analyzing a second set of data including data outside the first set of data. The list of suggestions can be presented, and user input selecting one of the suggestions can be received. Data represented by the selected suggestion can be entered in the data entry area in response to receiving the user input selecting the selected suggestion.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
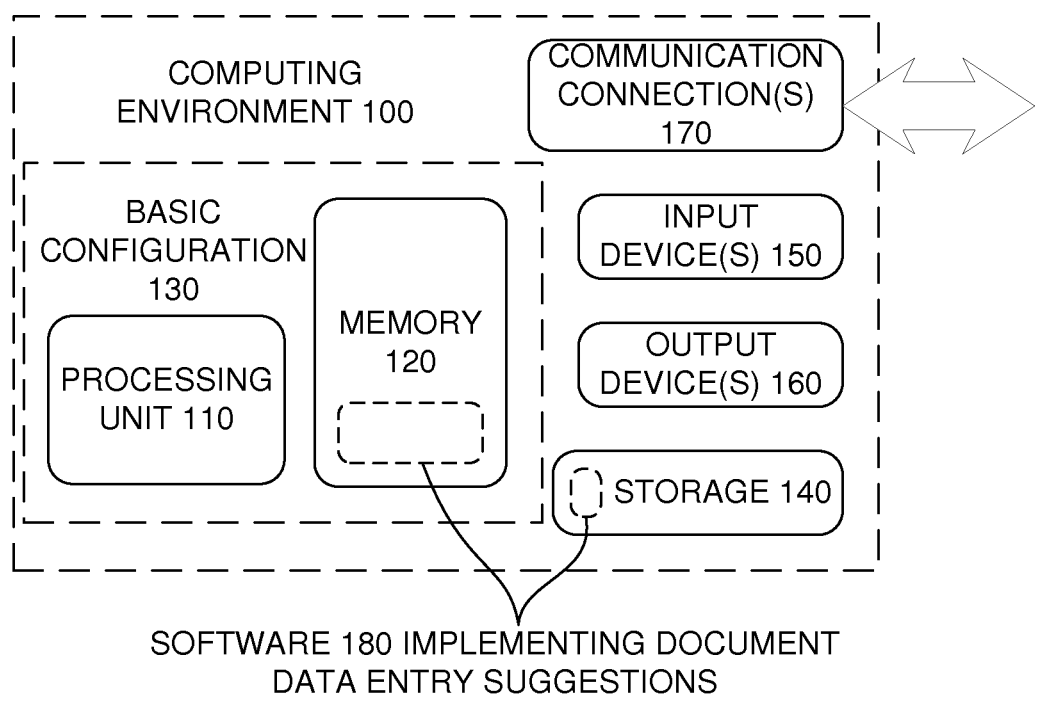
FIG. 1 is a block diagram of a suitable computing environment in which one or more of the described embodiments may be implemented.

Embodiments described herein are directed to techniques and tools for improved use of suggestion lists for data entry. Such improvements may result from the use of various techniques and tools separately or in combination.

Such techniques and tools may include generating suggestions from data already entered in other areas of a document. The underlying data structure and/or display layout of the document can be used along with the content of the document to generate a list of suggestions for entering in the designated data entry area. The list of suggestions may be generated and displayed to the user without the user manually entering data in the data entry area. The generated list may also include suggestions from other sources such as an existing dictionary-based autocomplete feature. The suggestion list can be offered in a variety of ways, such as leveraging and/or augmenting existing aspects of the user interface (such as using an existing keyboard suggestions feature from an application and/or operating system).

Accordingly, the tools and techniques described herein may provide one or more benefits such as more rapid insertion of text into a document, increasing the speed and ease with which documents can be edited, and/or improving user efficiency when inputting data into a document. The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can be used as an environment for data entry suggestions. Generally, various different general purpose or special purpose computing system configurations can be used. Examples of well-known computing system configurations that may be suitable for use with the tools and techniques described herein include, but are not limited to, server farms and server clusters, personal computers, server computers, hand-held devices (e.g., slate devices, smart phones, etc.), laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing document data entry suggestions as described herein.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Document Data Entry Suggestion System and Environment

Figure 2:
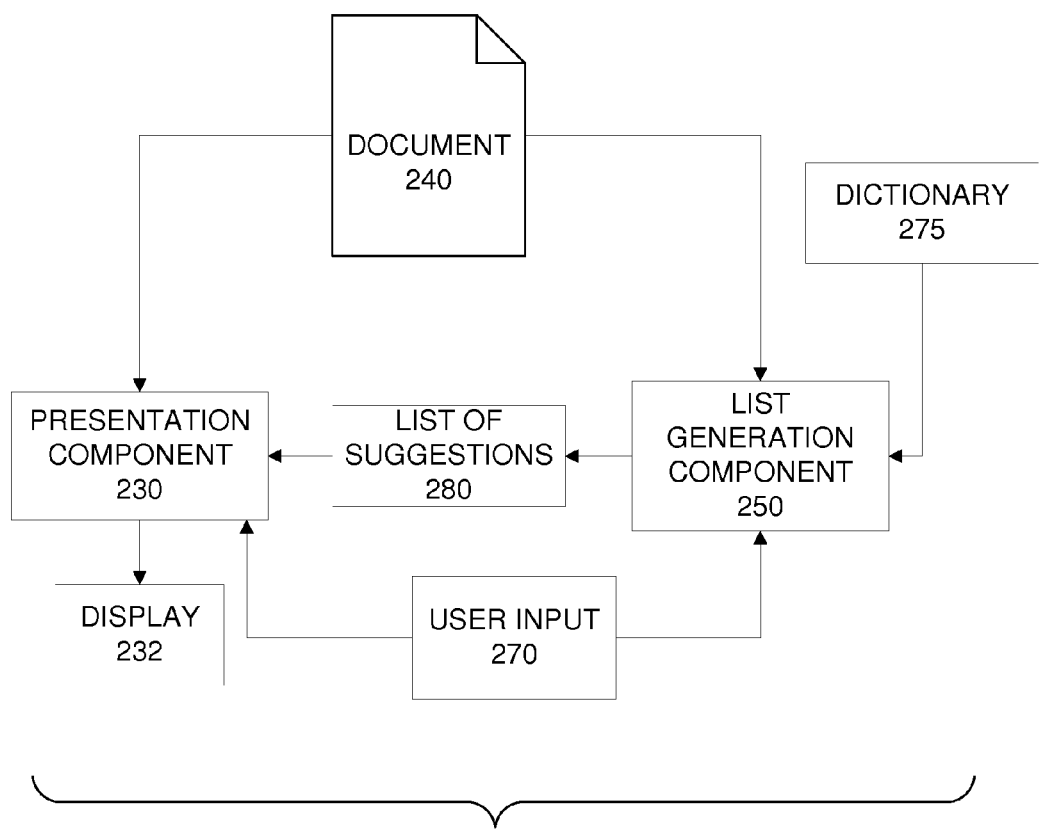
FIG. 2 is a schematic diagram of a document data entry suggestion environment.
Figure 2:
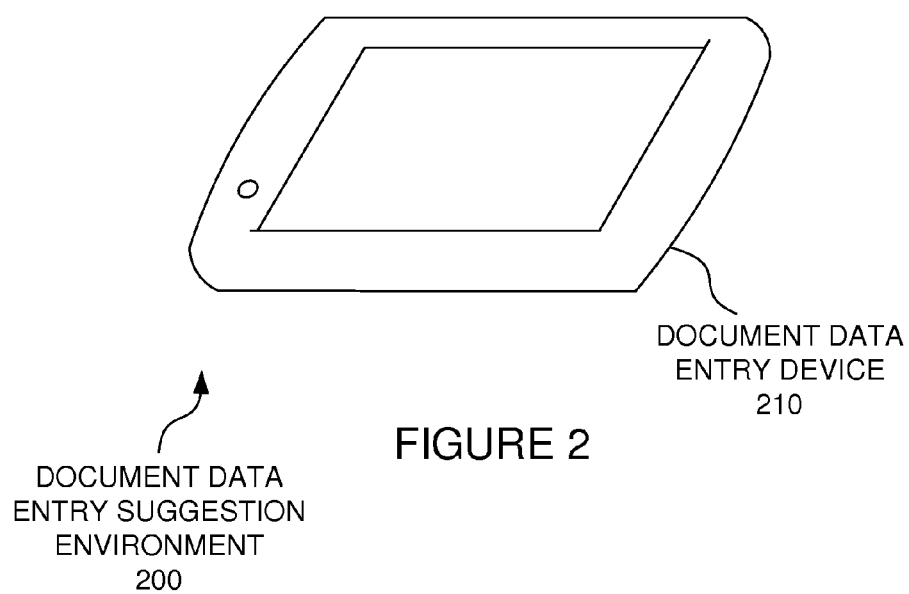

FIG. 2 is a schematic diagram of a document data entry suggestion environment (200) in conjunction with which one or more of the described embodiments may be implemented. The environment (200) can include a document data entry device (210), which could be any of various different types of device, such as a slate device, a smart phone, a laptop computer, a desktop computer, etc. The document data entry device (210) can include a display and one or more user input devices, as well as one or more of the other features discussed above with reference to FIG. 1. For example, the document data entry device (210) may include a touch screen for displaying and for receiving user input in the form of touch gestures. The document data entry device (210) can host a presentation component (230), such as a rendering engine for rendering or displaying information on a display (232), such as a touch screen. For example, the presentation component (230) can render a document (240) on the display (232).

The document data entry device (210) can also include a list generation component (250) that can analyze the document (240). For example, the list generation component (250) may analyze the structure of the document (240), the layout of a display of the document (240) by the presentation component (230), and the content of the document (240). The list generation component (250) may also analyze other information, such as entries in a dictionary (275) and user input (270) (e.g., text entered by user input (270)). Using the results of such analysis, the list generation component (250) can generate a list of suggestions (280) for data entry to be presented by the presentation component (230). For example, the presentation component (230) may present the list of suggestions (280) along with the document (240) on the display (232) when user input (270) is entering text in the document (240).

As noted above, the list generation component (250) can leverage the structure of the document (240) to determine suitable content suggestions that can be offered to the user in the list of suggestions (280). For example, in a grid-based application such as a spreadsheet or database application, the structure of rows and/or columns in the grid can be used to define suggestions. These may be the rows/columns where text is being entered, or even rows or columns elsewhere in the grid. For example, if the user is working in a table and has entered multiple rows of information above, this information can be used by the list generation component (250). In one specific example, if a customer enters "True" or "False" in the same column in each of the row entries above, it may be assumed that there is a high likelihood that the customer will enter "True" or "False" in the corresponding column of the row being edited. Accordingly, the list of suggestions (280) can include "True" and "False." This approach may also be used with documents that do not have a grid structure. For example, it could be used in a form where the same set of entries was entered respectively into a field previously. Besides just including in the list of suggestions (280) text that is entered elsewhere in the document (240), the list generation component (250) may include other suggestions. For example, the list generation component (250) may make suggestions based on recognized patterns. For example, if a user had entered "Monday" and "Tuesday" in two previous entries, the list of suggestions could include "Wednesday" as the first suggestion in the list of suggestions (280), followed by other days of the week. The same could be done for number sequences (e.g., if 1, 2, 3, and 4 were entered, the number 5 could be included as a suggestion), or other patterns. Additionally, the list generation component (250) could include entries from a dictionary (275) in the list of suggestions (280). For example, if some text has already been entered in a designated data entry area of the document (240), the list of suggestions (280) could include spelling predictions from the dictionary (275), along with suggestions from the analysis of data already entered elsewhere in the document (240).

The suggestions can be offered in a familiar and user friendly way when the user input (270) indicates the document (240) is to be edited. For example, when the user selects the cell or invokes the keyboard, a floating piece of user interface can be surfaced on the display (232) to display the list of suggestions (280). The user can the quickly pick a suggestion through user input (270) (e.g., with a touch gesture), possibly without having to type data into a keyboard. Building on this, these suggestions could also be used to augment and enhance existing autocomplete/text entry features, which may already be familiar to users of the document data entry device (210).

Figure 3:
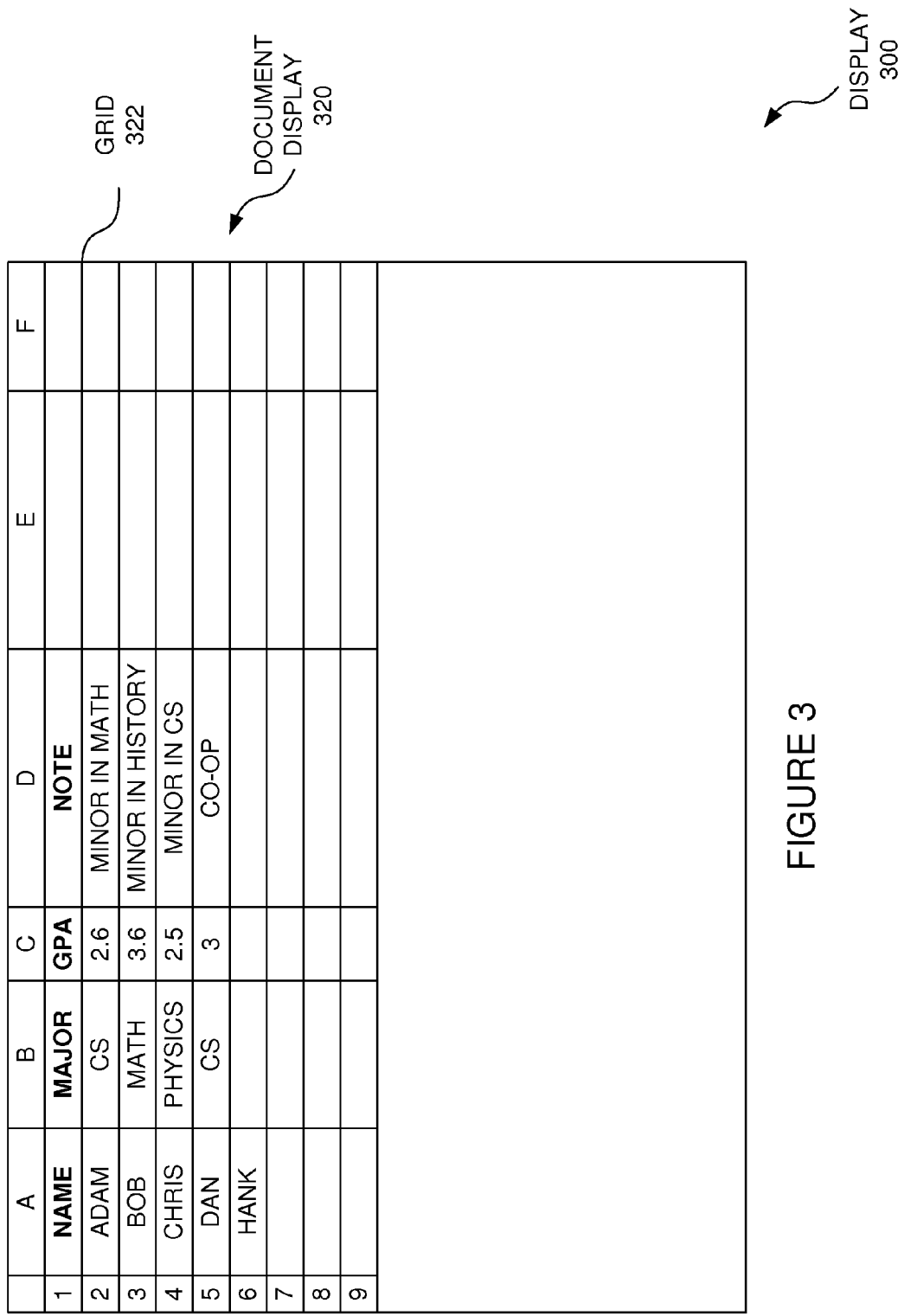
FIG. 3 is an illustration of a display that includes a display of a document.
Figure 4:
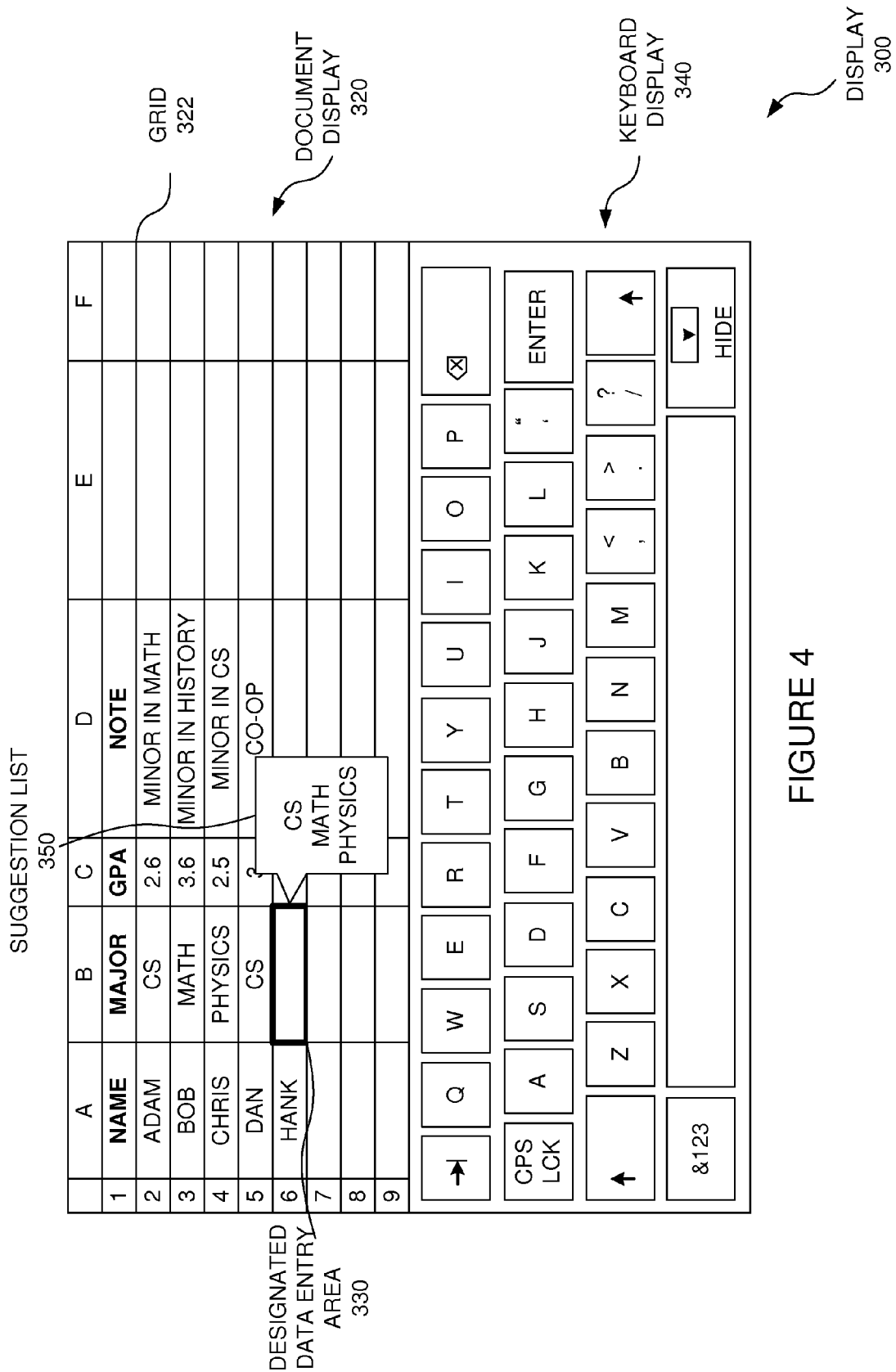
FIG. 4 is an illustration of the display of FIG. 3 after user input directed at a designated data entry area has been provided.
Figure 5:
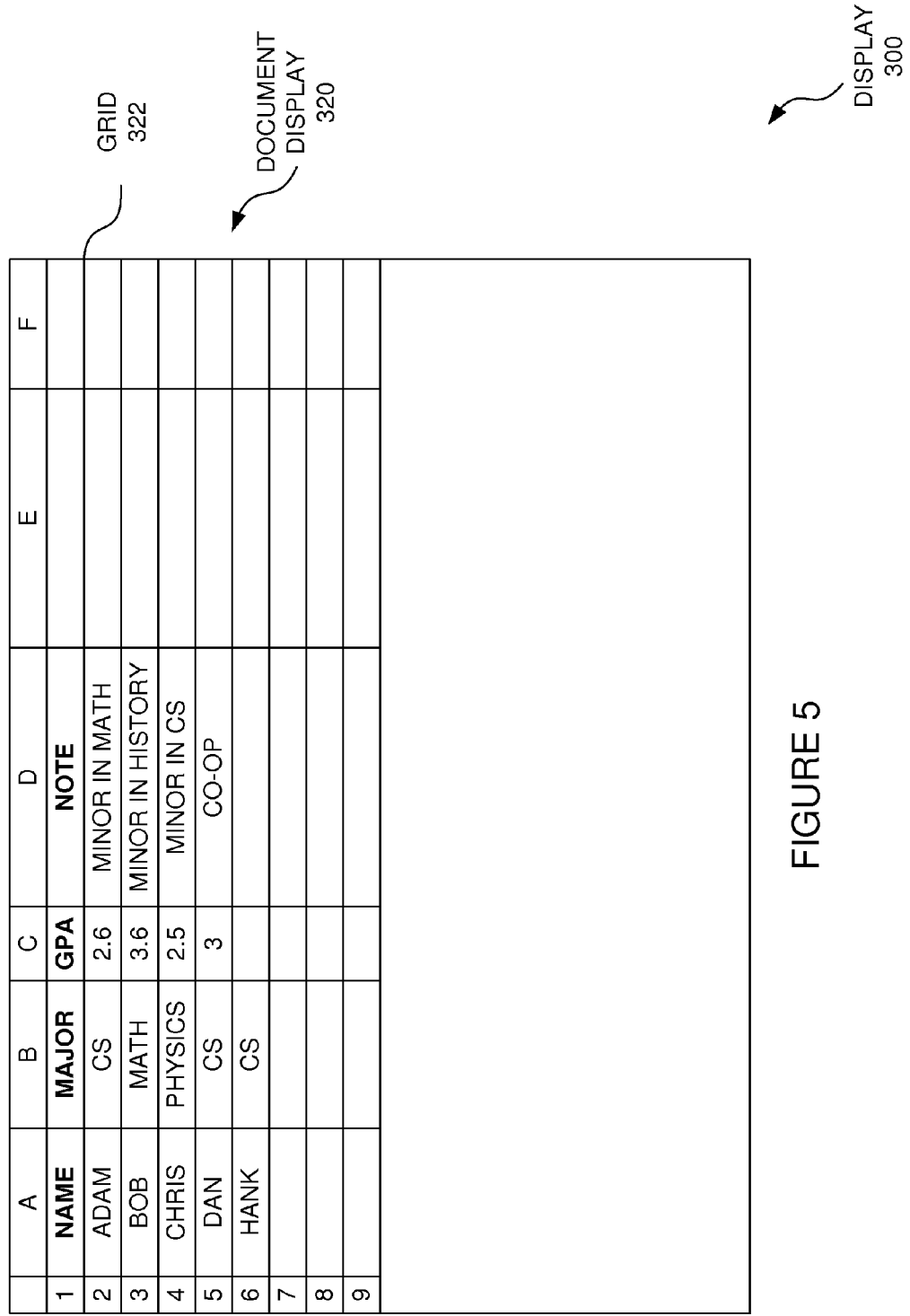
FIG. 5 is an illustration of the display of FIG. 3 after user input has been provided to select a data entry suggestion from a data entry suggestion list.

Some specific examples of user interface features for the document data entry suggestions will now be discussed with reference to FIGS. 3-10. Referring now to FIG. 3, a display (300) is illustrated. The display (300) can include a document display (320), which can display a document. In the illustrated example, of FIG. 3, the document display (320) is laid out in the form of a displayed grid (322) with columns and rows of data entry areas. Referring to FIG. 4, user input directed at a designated data entry area (330) has been provided. This could be done using any of various different user input devices, such as making a touch gesture on a touch screen at the designated data entry area (330), using a mouse to make a selection at the designated data entry area (330), using a touch pad to make a selection at the designated data entry area (330), etc. In response to the user input, the designated data entry area (330) may be highlighted. Also, a keyboard display (340) can be displayed if the display (300) is a touch screen. Additionally, a suggestion list (350) can be displayed. In the illustrated example, the suggestion list (350) is displayed as a floating menu proximal to the designated data entry area. In the example, the suggestion list includes the suggestions "CS", "MATH", and "PHYSICS"—all from data that had been entered in other rows of the same column as the designated data entry area (330). User input can be provided to select one of the suggestions of the suggestion list (350). For example, if user input is provided to select "CS", then "CS" can be entered in the designated data entry area, as illustrated in FIG. 5. As is also illustrated in FIG. 5, this user input selecting one of the suggestions can also result in the suggestion list (350) and the keyboard display (340) being removed from the display (300).

Figure 6:
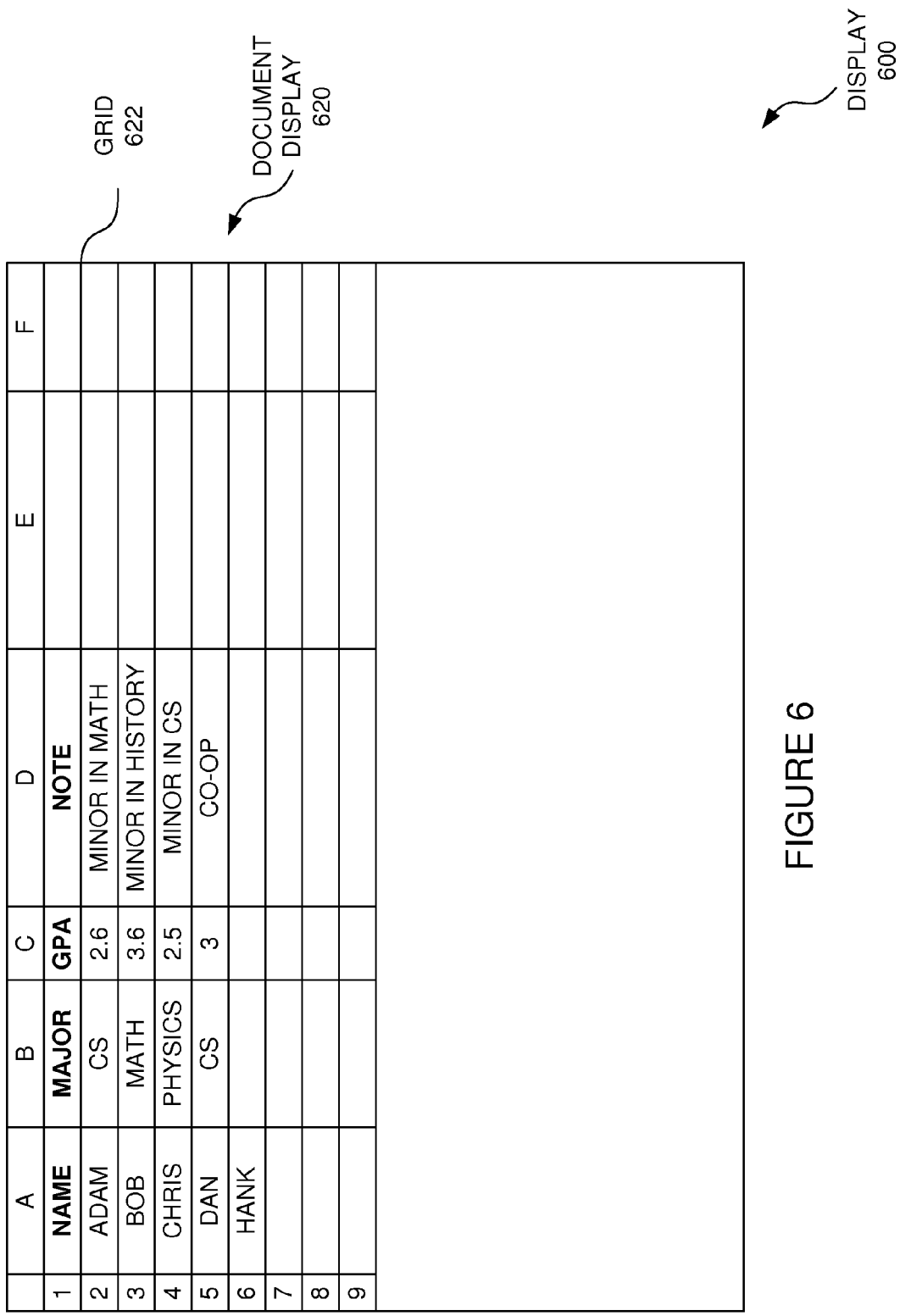
FIG. 6 is an illustration of another display that includes a display of a document.
Figure 7:
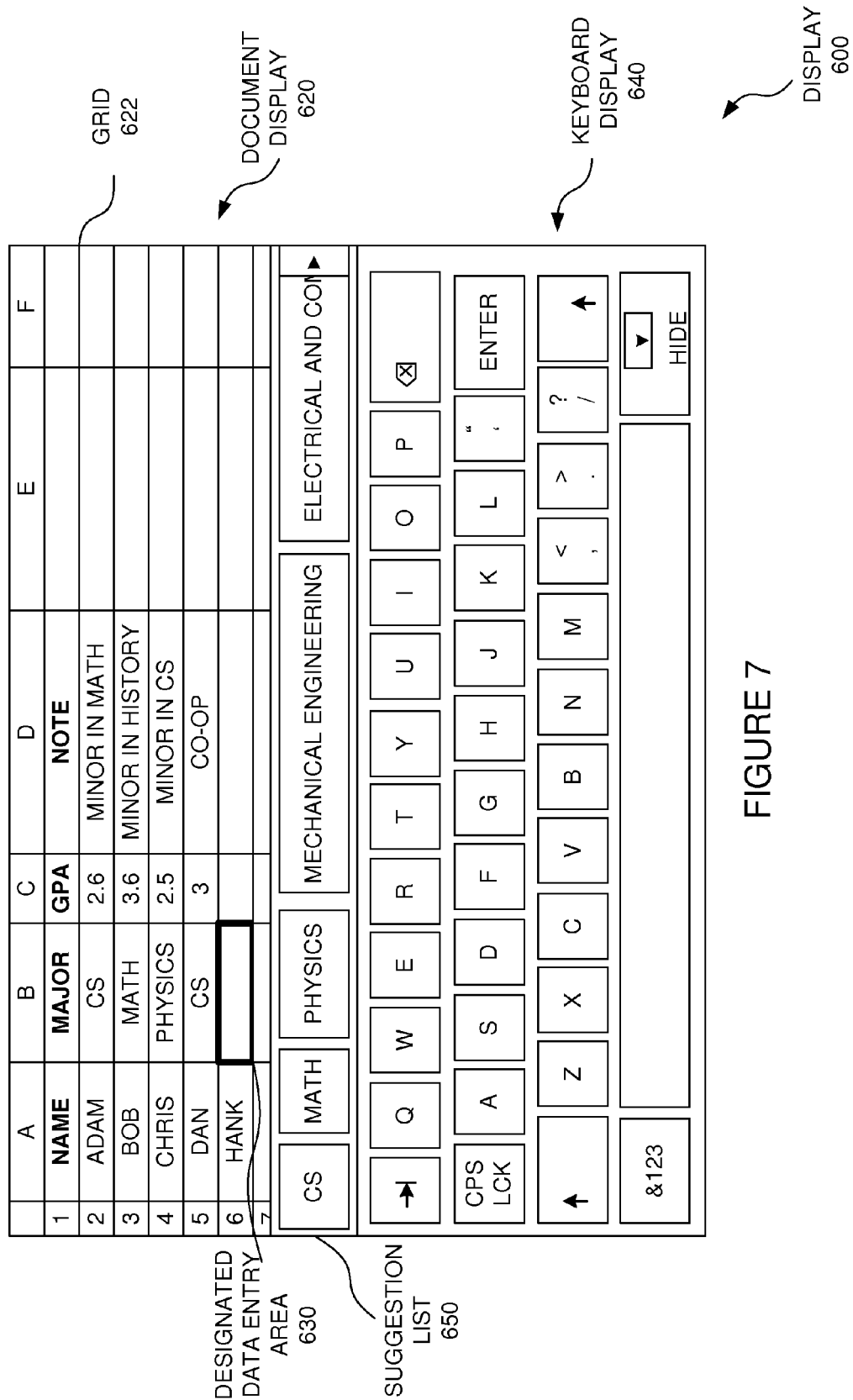
FIG. 7 is an illustration of the display of FIG. 6 after user input has been received directed at a designated data entry area and indicating that the designated data entry area is to be edited.

Referring now to FIGS. 6-10, another example of user interface features for document data entry suggestions will be discussed. Referring to FIG. 6, a display (600) is illustrated including a document display (620) in the form of a grid (622), similar to the display (300) of FIG. 3 above. Referring to FIG. 7, a data entry suggestions list feature will be discussed. This feature can build on the correction/text completion features offered on a virtual keyboard. Today, many phones and slates already offer text suggestions when typing, frequently showing significant parts of the words before a suggestion can be selected. The same user interface features can be used, but suggestions can be offered before typing begins. Additionally, related information elsewhere in the document itself can be used to generate the suggestions.

Referring still to FIG. 7, user input directed at a designated data entry area (630) and indicating that the user wants to edit the data entry area (630) can result in launching an on-screen keyboard display (640) and displaying a suggestion list (650) without further user input. In the illustrated example of FIG. 7, the suggestion list (650) is displayed proximal to the keyboard display (640) (just above the keyboard display (640)). At this point, a user can select one of the suggestions on the suggestion list (650) to enter the data value from the selected suggestion into the designated data entry area (630). This approach can allow for rapid insertion of new information into the document, especially when adding information to a form or spreadsheet, potentially without any input on the keyboard. As is illustrated in FIG. 7, all the suggestions in the suggestion list (650) may not fit into the allotted display area for the suggestion list (650). Accordingly, the suggestion list (650) can be scrolled using existing scrolling techniques (e.g., selecting an arrow button, dragging using a touch screen, etc.). Alternatively, some other technique can be used for displaying suggestions that did not initially fit into the allotted display area, such as some other technique used by an existing auto complete feature.

Figure 8:
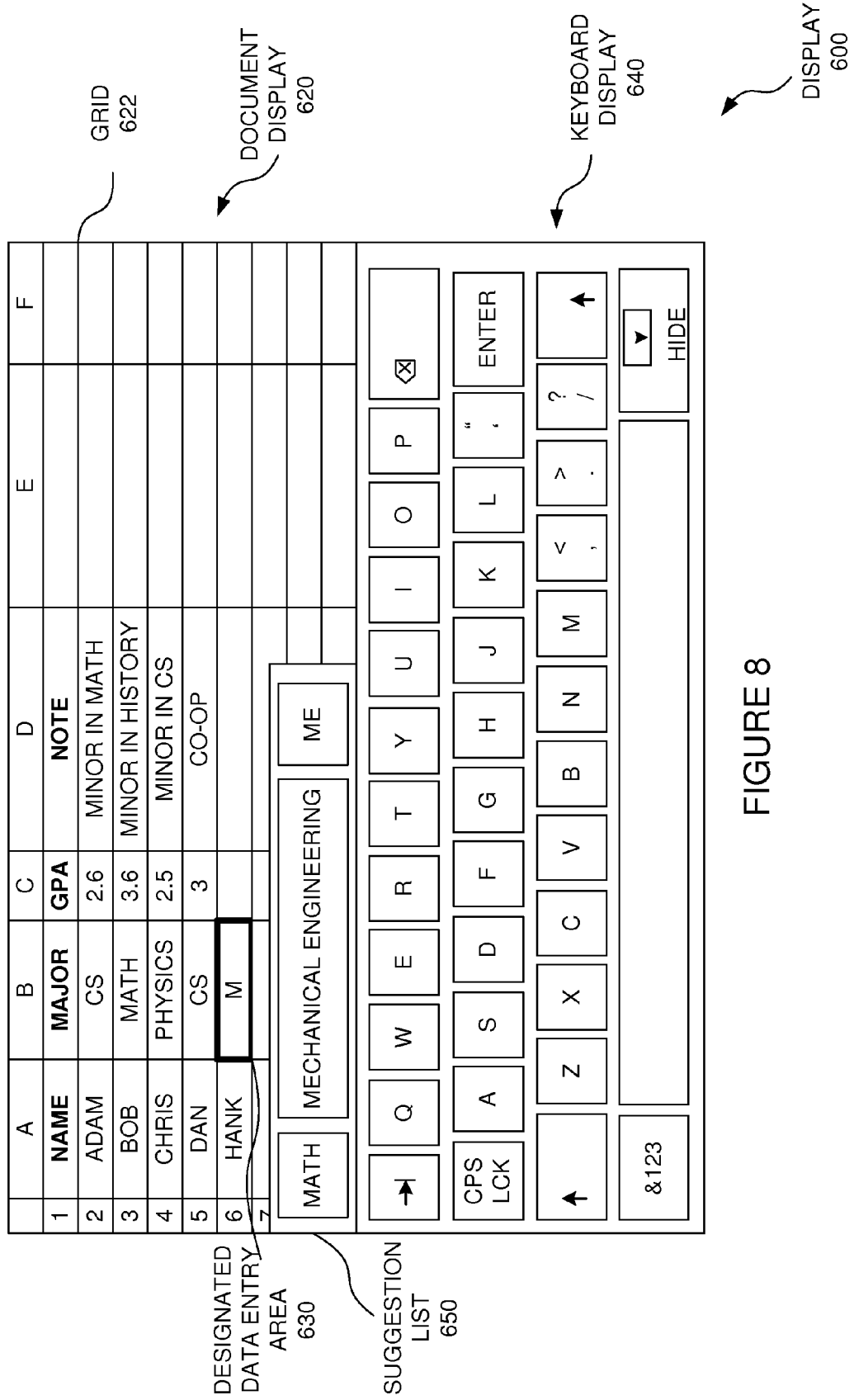
FIG. 8 is an illustration of the display of FIG. 6 after user input has been provided to manually enter data into the designated data entry area.

Referring now FIG. 8, user input may be provided to manually enter data into the designated data entry area (630). In the example of FIG. 8, the letter "M" has been typed using the keyboard display (640). In response to that user input, the letter "M" can be entered in the designated data entry area (630). Also in response to that user input, the suggestion list can be refined by displaying only suggestions from the suggestion list (650) that start with the letter "M". Additionally, when text is typed into the designated data entry area (630), the suggestion list (650) may include suggestions from analyzing other areas of the document, and it may also include suggestions from a dictionary (e.g., spelling predictions). For example, as illustrated in FIG. 8, the suggestion list includes the term "MATH" (entered in another row of the same column in the document display (620)), the term "MECHANICAL ENGINEERING" (which could have been found in another list of majors in another column of the document or even from some other list of majors), and the term "ME" (which could refer to a common word starting with the letter "M" obtained from a spelling prediction dictionary). The suggestions in the suggestion list (650) could be ordered using various different types of information, such as the same types of information that are used to obtain the suggestions. For example, in FIG. 8, the term "MATH" suggestion can be listed first because that suggestion comes from the same column in the grid (622). At this point, user input could be provided to select one of the suggestions of the suggestion list (650) to enter the corresponding data into the designated data entry area (630).

Figure 9:
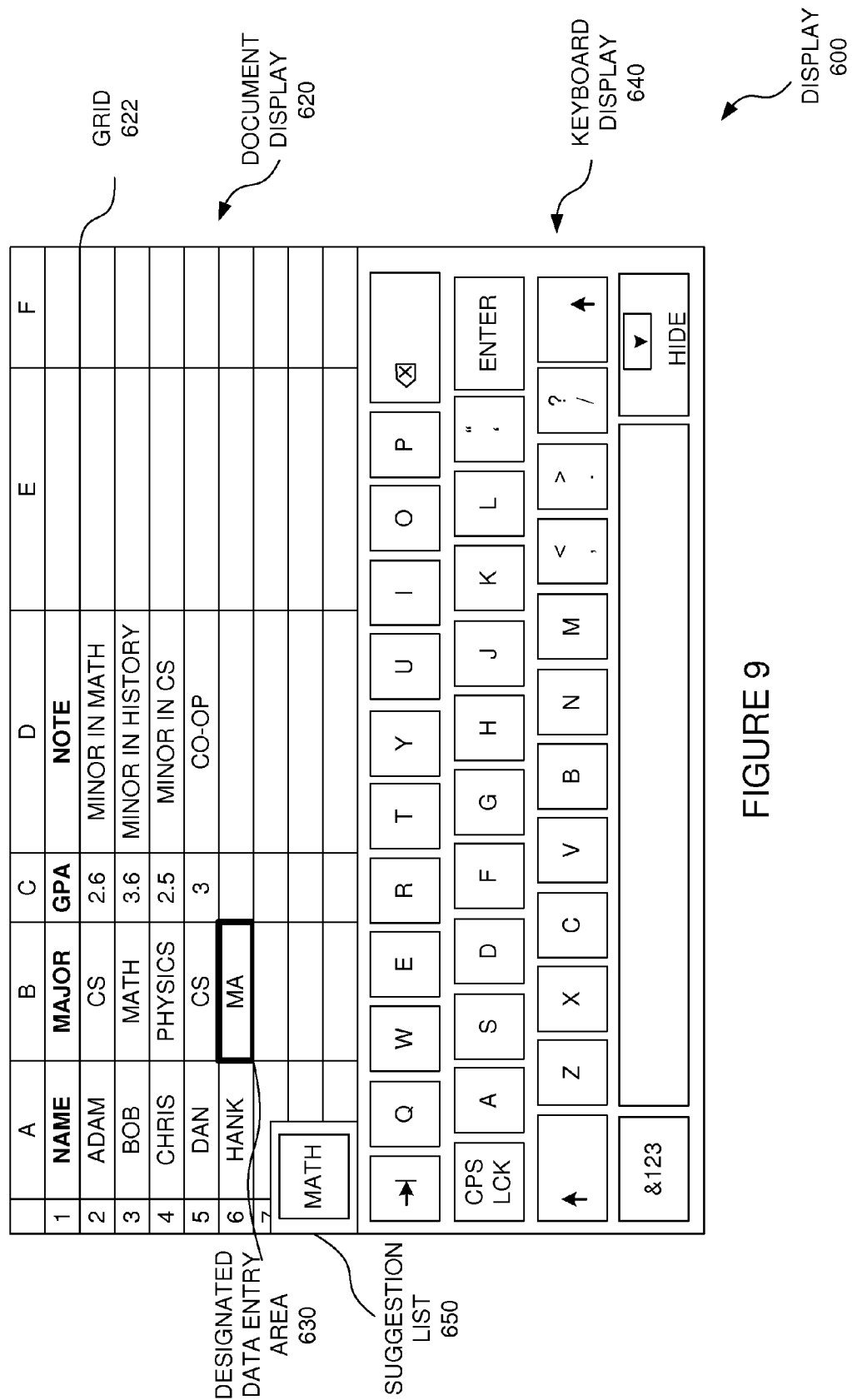
FIG. 9 is an illustration of the display of FIG. 6 after user input has been provided to manually enter additional data into the designated data entry area.
Figure 10:
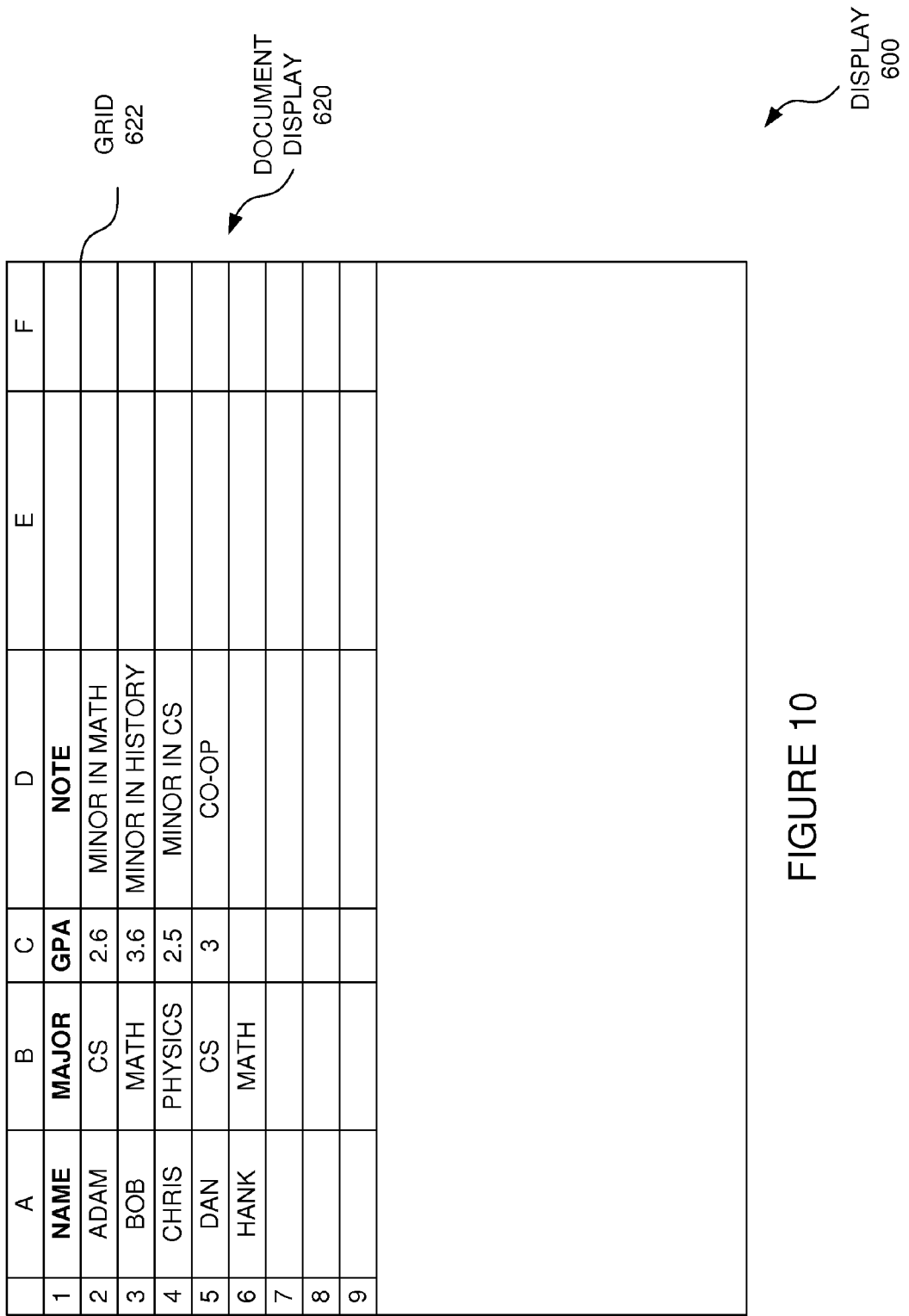
FIG. 10 is an illustration of the display of FIG. 6 after user input is provided to select a data entry suggestion from a list of data entry suggestions.

User input can be provided to manually enter additional data into the designated data entry area (630). For example, as illustrated in FIG. 9, the additional letter "A" has been typed, so that the designated data entry area now includes "MA". This can result in just a single matching suggestion ("MATH") being recommended in the suggestion list (650). In this case, the suggestion could be directly selected, or the "ENTER" button of the keyboard display (640) could be selected to select that single suggestion (i.e., the "ENTER" button is overridden allowing selection of that button to apply the suggestion). Referring now to FIG. 10, selecting the suggestion results in the data from the selected suggestion (the text "MATH") being entered in the designated data entry area. The selection of the suggestion can also result in the suggestion list (650) and the keyboard display (640) being removed from the display (600).

III. Document Data Entry Suggestion Techniques

Several document data entry suggestion techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique.

Figure 11:
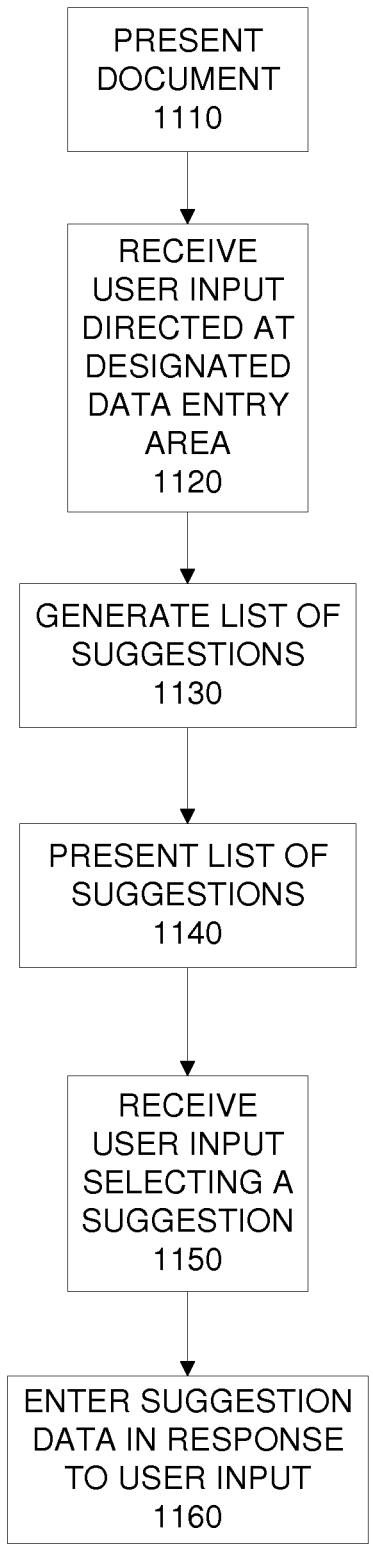
FIG. 11 is a flowchart of a document data entry suggestion technique.

Referring to FIG. 11, a document data entry suggestion technique will be described. The technique can include presenting (1110) a document having multiple data entry areas. User input can be received (1120), where the user input is directed at a designated one of the data entry areas. The user input may also indicate that the designated data entry area is to be edited. A list of suggestions for the designated data entry area can be generated (1130). Generating (1130) the list can include analyzing data previously entered into one or more data entry areas of the document other than the designated data entry area. This may include analyzing data in a database that the document can display. For example, the document may be a form that can be used for editing underlying data in a database. This analysis can include analyzing a structure of the document, and/or analyzing a layout of a display of the document. The analysis may include recognizing one or more patterns in the data previously entered into the one or more data entry areas of the document. Generating (1130) the list of suggestions can include using the recognized pattern(s) to predict one or more suggestions and including the one or more predicted suggestions in the list of suggestions. For example, the predicted suggestions may be suggestions of data that has not yet been entered in the document. Generating (1130) the list of suggestions may also include analyzing one or more dictionaries outside the document. Generating (1130) the list of suggestions may include meshing one or more suggestions from analyzing the one or more dictionaries outside the document with one or more suggestions from analyzing data previously entered into one or more data entry areas of the document.

The list of suggestions can be presented (1140) without having received manual entry of data in the designated data entry area. For example, the list of suggestions may be displayed on a display device, such as on a touch screen. Presenting (1140) the list of suggestions can include displaying the list of suggestions as a floating menu proximal to the designated data entry area. Presenting (1140) the list of suggestions can include displaying the list of suggestions proximal to a displayed keyboard on a touch screen, or displaying the list of suggestions in some other area of a screen and/or using some other technique. For example, the list may be displayed in some other standard place where an application and/or operating system would already show suggestions such as auto corrections/auto complete suggestions.

A manual entry of text into the designated data entry area can be received, and the list of suggestions can be refined in response to receiving the manual entry of text. For example, the list of suggestions can be refined to remove suggestions that do not match the manually-entered text.

User input selecting one of the suggestions can be received (1150). Data represented by the selected suggestion can be entered (1160) in response to receiving the user input selecting the selected suggestion.

Figure 12:
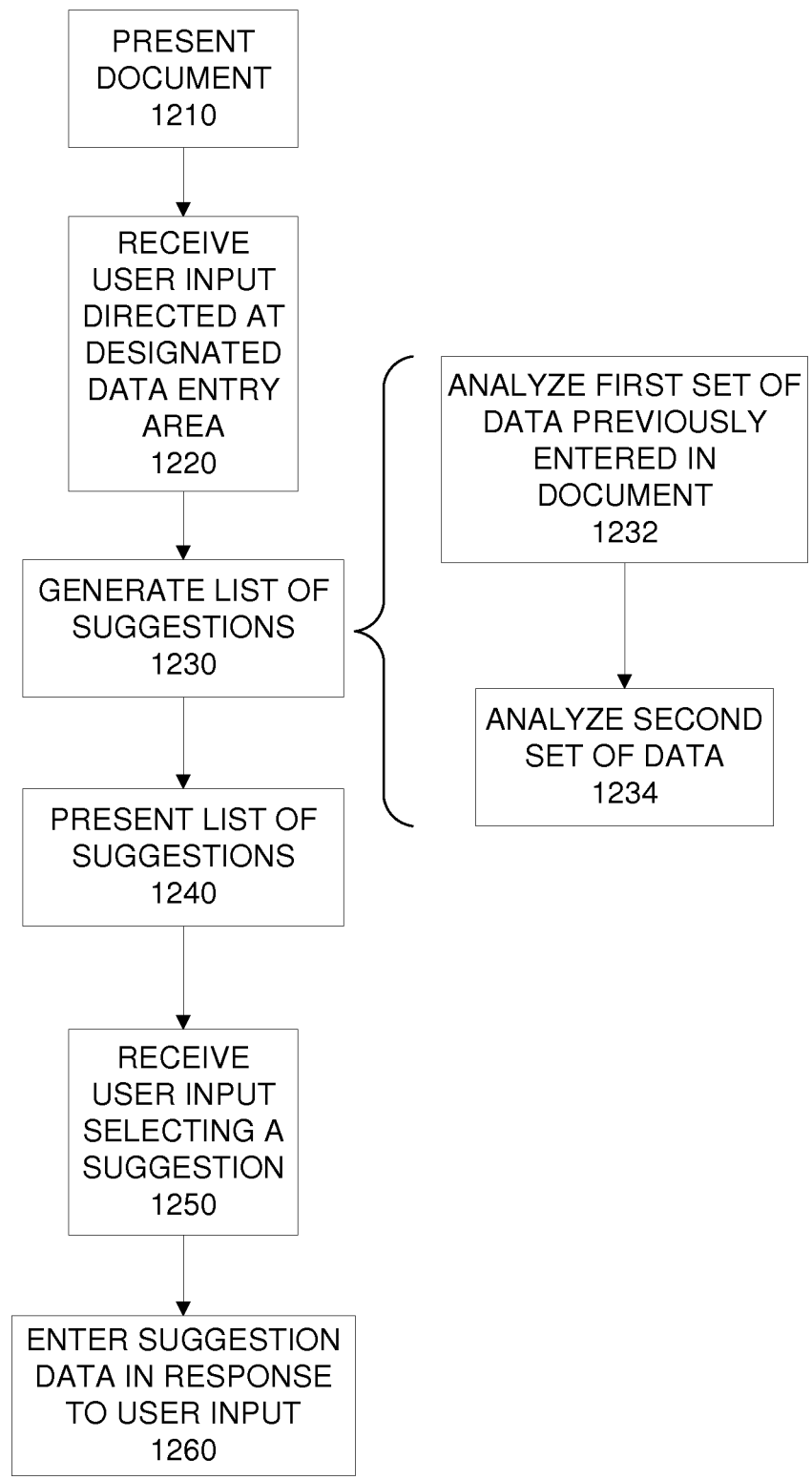
FIG. 12 is a flowchart of another document data entry suggestion technique.

Referring to FIG. 12, another document data entry suggestion technique will be described. The technique can include presenting (1210) a document having multiple data entry areas. User input can be received (1220), where the user input is directed at a designated one of the data entry areas. A list of suggestions for the designated data entry area can be generated (1230). Generating (1230) the list can include analyzing (1232) a first set of data previously entered into one or more data entry areas of the document other than the designated data entry area, and analyzing (1234) a second set of data including data outside the first set of data. Analyzing (1232) data previously entered into one or more data entry areas of the document includes analyzing a structure selected from a group consisting of a structure of the document, a layout of a display of the document, and combinations thereof. The second set of data can include data manually entered in the designated data entry area and/or one or more entries in a dictionary. Also, the technique may further include receiving a manual entry of data into the designated data entry area, and refining the list of suggestions in response to receiving the manual entry of data.

The list of suggestions can be presented (1240). The list of suggestions may be presented (1240) without having received manual entry of data in the designated data entry area. Also, generating the list of suggestions and presenting the list of suggestions can be done in response to receiving the user input directed at the designated data entry area.

User input selecting one of the suggestions can be received (1250). Data represented by the selected suggestion can be entered (1260) in the data entry area in response to receiving the user input selecting the selected suggestion.

Figure 13:
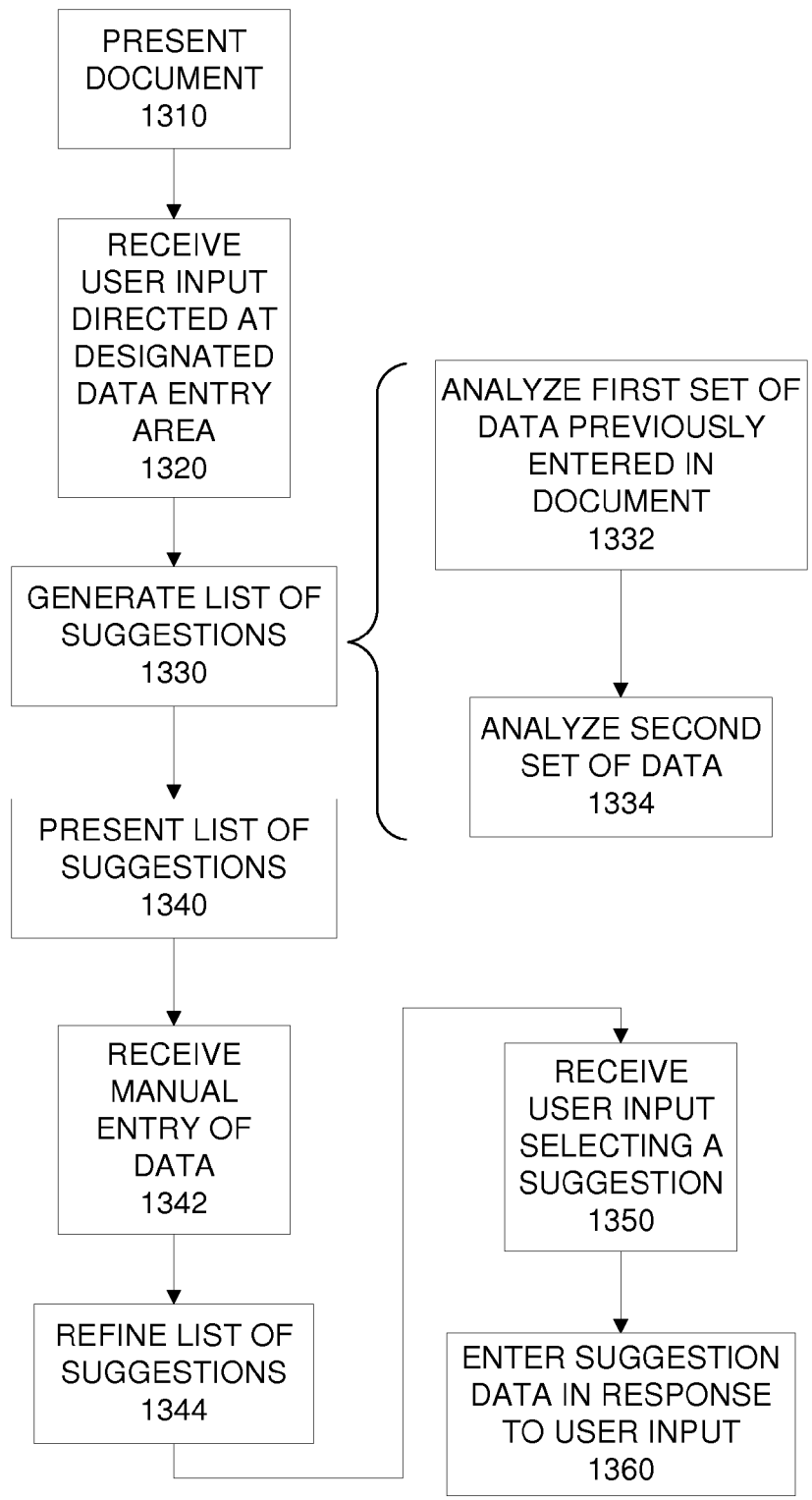
FIG. 13 is a flowchart of yet another document data entry suggestion technique.

Referring to FIG. 13, yet another document data entry suggestion technique will be described. The technique can include presenting (1310), where the presented document can include a grid having multiple data entry areas. User input can be received (1320), where the user input is directed at a designated one of the data entry areas. In response to receiving (1320) the user input, a list of suggestions can be generated (1330) for the designated data entry area. Generating (1330) the list can include analyzing (1332) a first set of data previously entered into one or more data entry areas of the document other than the designated data entry area. Analyzing (1332) data previously entered into one or more data entry areas of the document can include analyzing a structure selected from a group consisting of a structure of the document, a layout of a display of the document, and combinations thereof.

Generating (1330) the list can also include analyzing (1334) a second set of data that includes data manually entered in the designated data entry area and one or more entries in a dictionary. In response to receiving (1320) the user input directed at the designated data entry area, the list of suggestions can be presented (1340) without having received manual entry of data in the designated data entry area.

A manual entry of data can be received (1342) into the designated data entry area. The list of suggestions can be refined (1344) in response to receiving the manual entry of data. User input selecting one of the suggestions can be received (1350), and data represented by the selected suggestion can be entered (1360) in the data entry area in response to receiving the user input selecting the selected suggestion.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system comprising:
    at least one processor; and
    memory comprising instructions stored thereon that when executed by at least one processor cause at least one processor to perform acts comprising:
        displaying a document comprising multiple data entry areas;
        receiving user input directed at a designated data entry area of the data entry areas;
        generating a list of one or more suggestions for the designated data entry area, generating the list comprising analyzing a set of data previously entered into one or more data entry areas of the document other than the designated data entry area, analyzing the set of data comprising identifying a pattern spanning multiple entries in the set of data and including in the list at least one suggestion that fits the identified pattern, the at least one suggestion that fits the pattern not having been included in the data entry areas prior to the receipt of the user input directed at the designated data entry area;
        in response to receiving the user input directed at the designated data entry area, displaying the list of one or more suggestions;
        receiving user input selecting one of the one or more suggestions; and
        entering data represented by the selected suggestion in the designated data entry area in response to receiving the user input selecting the selected suggestion.

2. The computer system of claim 1, wherein the pattern comprises multiple entries including terms that are in a list of related terms, and wherein identifying the pattern comprises accessing the list of related terms.

3. The computer system of claim 1, wherein the identified pattern is an ordered sequential pattern, and wherein the at least one suggestion that fits the pattern continues the ordered sequential pattern.

4. The computer system of claim 1, wherein the analyzing of the set of data previously entered into the one or more data entry areas of the document other than the designated data entry area comprises analyzing a structure of the document.

5. The computer system of claim 1, wherein the analyzing of the set of data previously entered into the one or more data entry areas of the document other than the designated data entry area comprises analyzing a layout of a display of the document.

6. The computer system of claim 1, wherein the generating of the list of one or more suggestions comprises analyzing one or more dictionaries outside the document.

7. The computer system of claim 1, wherein the generating of the list of one or more suggestions comprises:
   including in the list one or more suggestions from analyzing one or more dictionaries outside the document; and
   including in the list one or more suggestions from analyzing data previously entered into one or more data entry areas of the document.

8. The computer system of claim 1, wherein displaying the list comprises displaying the list of one or more suggestions as a floating menu proximal to the designated data entry area.

9. The computer system of claim 1, wherein displaying the list comprises displaying the list of one or more suggestions proximal to a displayed keyboard on a touch screen.

10. The computer system of claim 1, wherein the acts further comprise receiving a manual entry of text into the designated data entry area, and refining the list of one or more suggestions in response to receiving the manual entry of text.

11. The computer system of claim 1, wherein the list of one or more suggestions is a list of multiple suggestions.

12. A computer-implemented method comprising:
   displaying, via a computer system, a digital document comprising multiple data entry areas;
   receiving, via the computer system, user input directed at a designated data entry area of the data entry areas;
   generating, via the computer system, a computer-readable list of one or more suggestions for the designated data entry area, generating the list comprising analyzing a set of data previously entered into one or more data entry areas of the document other than the designated data entry area, analyzing the set of data comprising identifying a pattern spanning multiple entries in the set of data and including in the list at least one suggestion that fits the identified pattern, the at least one suggestion that fits the pattern not having been included in the data entry areas prior to the receipt of the user input directed at the designated data entry area;
   in response to receiving the user input directed at the designated data entry area, displaying, via the computer system, the list of one or more suggestions;
   receiving, via the computer system, user input selecting one of the one or more suggestions; and
   entering, via the computer system, data represented by the selected suggestion in the designated data entry area in response to receiving the user input selecting the selected suggestion.

13. The computer-implemented method of claim 12, wherein the pattern comprises multiple entries including terms that are in a list of related terms, and wherein identifying the pattern comprises accessing the list of related terms.

14. The computer-implemented method of claim 12, wherein the identified pattern is an ordered sequential pattern, and wherein the at least one suggestion that fits the pattern continues the ordered sequential pattern.

15. The computer-implemented method of claim 12, wherein the analyzing of the set of data previously entered into the one or more data entry areas of the document other than the designated data entry area comprises analyzing a structure of the document.

16. The computer-implemented method of claim 12, wherein the analyzing of the set of data previously entered into the one or more data entry areas of the document other than the designated data entry area comprises analyzing a layout of a display of the document.

17. The computer-implemented method of claim 12, wherein the generating of the list of one or more suggestions comprises analyzing one or more dictionaries outside the document.

18. The computer-implemented method of claim 12, wherein the generating of the list of one or more suggestions comprises:
   including in the list one or more suggestions from analyzing one or more dictionaries outside the document; and
   including in the list one or more suggestions from analyzing data previously entered into one or more data entry areas of the document.

19. The computer-implemented method of claim 12, wherein displaying the list comprises displaying the list of one or more suggestions as a floating menu proximal to the designated data entry area.

20. One or more computer-readable memory having computer-executable instructions embodied thereon that, when executed by at least one processor, cause at least one processor to perform acts comprising:
   displaying a document comprising multiple data entry areas;
   receiving user input directed at a designated data entry area of the data entry areas;
   generating a list of one or more suggestions for the designated data entry area, generating the list comprising analyzing a set of data previously entered into one or more data entry areas of the document other than the designated data entry area, analyzing the set of data comprising identifying a pattern spanning multiple entries in the set of data and including in the list at least one suggestion that fits the identified pattern, the at least one suggestion that fits the pattern not having been included in the data entry areas prior to the receipt of the user input directed at the designated data entry area;
   in response to receiving the user input directed at the designated data entry area, displaying the list of one or more suggestions;
   receiving user input selecting one of the one or more suggestions; and
   entering data represented by the selected suggestion in the designated data entry area in response to receiving the user input selecting the selected suggestion.

* * * * *